United States Patent
Yoshida

(10) Patent No.: US 10,852,656 B2
(45) Date of Patent: Dec. 1, 2020

(54) OPTICAL DEFLECTOR, OPTICAL SCANNING DEVICE INCLUDING OPTICAL DEFLECTOR, AND IMAGE FORMING APPARATUS INCLUDING OPTICAL SCANNING DEVICE

(71) Applicant: KYOCERA Document Solutions Inc., Osaka (JP)

(72) Inventor: Shingo Yoshida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/695,581

(22) Filed: Nov. 26, 2019

(65) Prior Publication Data

US 2020/0166864 A1 May 28, 2020

(30) Foreign Application Priority Data

Nov. 28, 2018 (JP) ................................. 2018-222217

(51) Int. Cl.
  *G03G 15/04* (2006.01)
  *G02B 26/12* (2006.01)

(52) U.S. Cl.
  CPC ....... *G03G 15/04036* (2013.01); *G02B 26/12* (2013.01)

(58) Field of Classification Search
  CPC ... G03G 15/04036; G02B 26/10; G02B 26/12
  See application file for complete search history.

(56) References Cited

U.S. PATENT DOCUMENTS

| | | | | |
|---|---|---|---|---|
| 6,400,488 B1 * | 6/2002 | Nagasaka | ............... | G02B 26/12 359/212.1 |
| 2005/0243393 A1 * | 11/2005 | Park | ........................ | G02B 26/12 359/216.1 |
| 2017/0299976 A1 * | 10/2017 | Mizutani | .......... | G03G 15/04036 |

FOREIGN PATENT DOCUMENTS

| | | | |
|---|---|---|---|
| JP | 06095021 A | * | 4/1994 |
| JP | 2017-191257 | | 10/2017 |

* cited by examiner

*Primary Examiner* — Sophia S Chen

(74) *Attorney, Agent, or Firm* — Wenderoth, Lind & Ponack, L.L.P.

(57) ABSTRACT

An optical deflector is configured such that a distance between a circumscribed circle of a rotary polyhedron centered on an axis of the rotary polyhedron and an inner peripheral surface of a peripheral wall of a cover member in a radial direction of the rotary polyhedron is largest at both of circumferential ends of an opening of the cover member.

9 Claims, 17 Drawing Sheets

OPTICAL DEFLECTOR, OPTICAL SCANNING DEVICE INCLUDING OPTICAL DEFLECTOR, AND IMAGE FORMING APPARATUS INCLUDING OPTICAL SCANNING DEVICE

CROSS-REFERENCE TO RELATED APPLICATION(S)

This application is based upon and claims the benefit of priority from Japanese Patent Application No. 2018-222217 filed on Nov. 28, 2018, the entire contents of which are incorporated herein by reference.

BACKGROUND

The technology disclosed herein relates to an optical deflector, an optical scanning device including an optical deflector, and an image forming apparatus including an optical scanning device.

An optical deflector is installed in, e.g., an image forming apparatus. Such an optical deflector includes a rotary polyhedron and a cover covering the rotary polyhedron, and the cover has an opening facing a peripheral surface of the rotary polyhedron. A light emitted from a light source is applied to the peripheral surface of the rotary polyhedron through the opening of the cover, and the rotary polyhedron deflects the light while rotating about an axis thereof to scan the light on an object to be irradiated, i.e., an image carrier, through the opening. Thereby, an electrostatic latent image is formed on a surface of the image carrier.

Since the cover of the optical deflector of this type is a non-closed type having an opening as described above, noises generated by rotation of the rotary polyhedron leak out of the cover through the opening. Accordingly, in the conventional art, the opening is formed as small as possible so as to reduce the noises.

SUMMARY

An aspect of the present disclosure provides an optical deflector including a rotary polyhedron and a cover member. The cover member covers the rotary polyhedron. The cover member has an opening facing a peripheral surface of the rotary polyhedron. A light beam emitted from a light source is applied to the peripheral surface of the rotary polyhedron through the opening of the cover member. The rotary polyhedron deflects the light beam while rotating about an axis thereof to scan the light beam on an object to be irradiated through the opening.

The optical deflector is configured such that a distance between a circumscribed circle of the rotary polyhedron centered on the axis of the rotary polyhedron and an inner peripheral surface of a peripheral wall of the cover member in a radial direction of the rotary polyhedron is largest at both of circumferential ends of the opening.

Another aspect of the present disclosure provides an optical scanning device including the optical deflector and the light source.

Another aspect of the present disclosure provides an image forming apparatus including the optical scanning device and the object to be irradiated. The object to be irradiated is an image carrier having a surface on which an electrostatic latent image is to be formed.

DETAILED DESCRIPTION

Hereinafter, example embodiments of the technology disclosed herein will be described in detail on the basis of the drawings. It should be noted that the technology disclosed herein is not limited to the embodiments described below.

Figure 1:
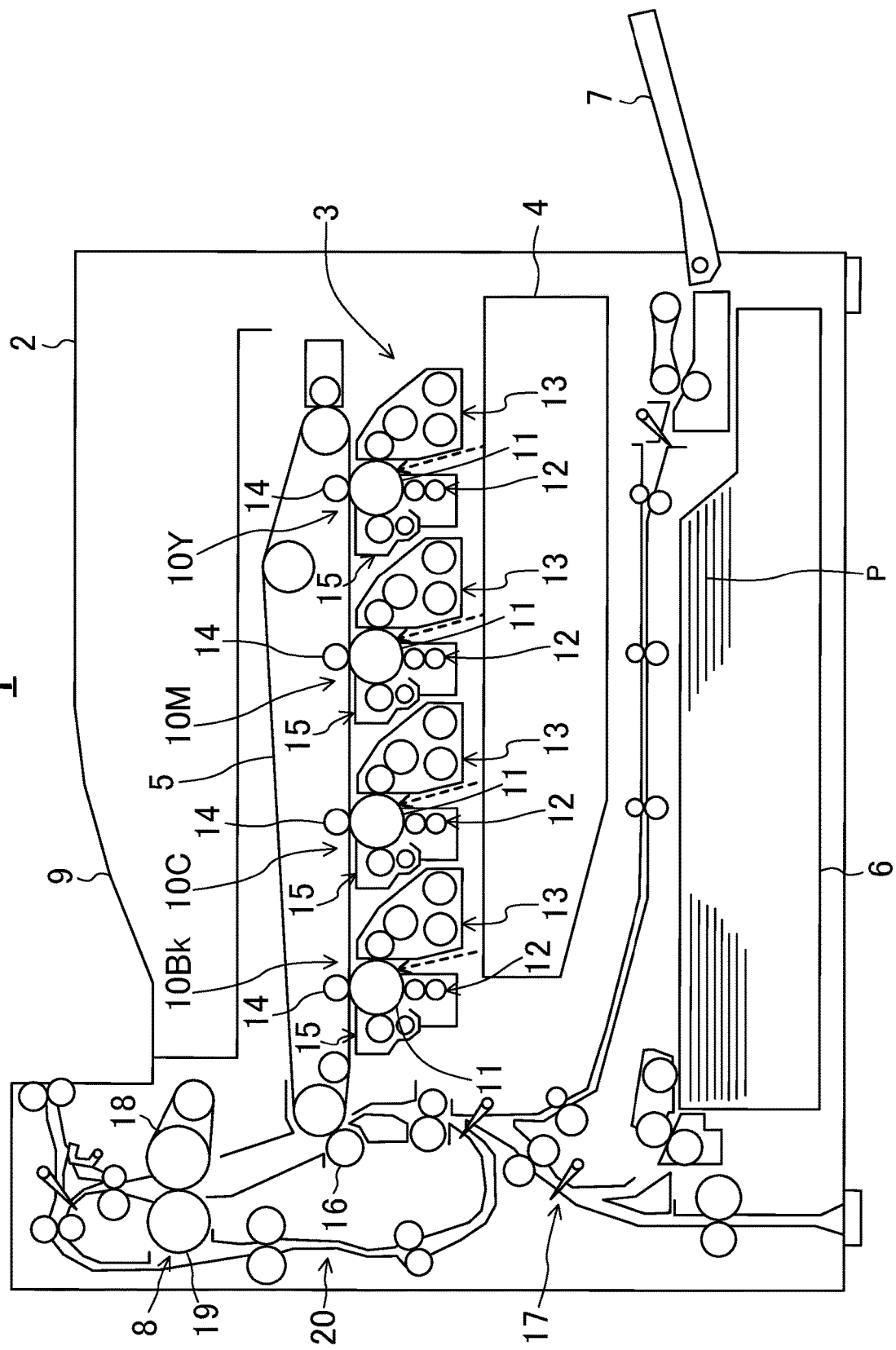
FIG. 1 is a sectional view of a schematic configuration of an image forming apparatus.

FIG. 1 shows a schematic configuration of an image forming apparatus 1 according to an example embodiment. The image forming apparatus 1 is a tandem-type color printer and has an image formation part 3 in a box-shaped casing 2. The image formation part 3 forms by transfer an image on a sheet P on the basis of image data transmitted from an external device such as a computer connected to a network or the like. An optical scanning device 4 that radiates a laser beam is disposed under the image formation part 3. A transfer belt 5 is disposed above the image forming part 3. A sheet storage unit 6 that stores sheets P is disposed under the optical scanning device 4, and a manual sheet feed unit 7 is disposed at a lateral side of the sheet storage unit 6. A fixing unit 8 that performs a fixing process on the image formed on the sheet P is disposed at a lateral side of and above the transfer belt 5. Reference numeral 9 indicates a sheet discharge unit which is disposed at the top of the casing 2 and to which the sheet P subjected to the fixing process in the fixing unit 8 is discharged.

The image formation part 3 includes four image forming units 10Y, 10M, 10C, and 10Bk aligned along the transfer belt 5. The image forming units 10Y, 10M, 10C, and 10Bk respectively form yellow (Y), magenta (M), cyan (C), and black (Bk) toner images on the basis of image information transmitted from the external device. In the description below, reference numerals are suffixed with the letters "Y", "M", "C," and "Bk" when the color correspondence need to be distinguished from each other, while the letters are omitted when the color correspondence does not need to be distinguished from each other.

Each image forming unit 10Y, 10M, 10C, 10Bk has a photosensitive drum 11. The photosensitive drum 11 serves as an image carrier and an object to be irradiated. A charger 12 is disposed directly under each photosensitive drum 11. A developing device 13 is disposed at one lateral side of each photosensitive drum 11. A primary transfer roller 14 is disposed directly above each photosensitive drum 11. A cleaning unit 15 is disposed on the other lateral side of each photosensitive drum 11. The cleaning unit 15 cleans a peripheral surface of the photosensitive drum 11.

The peripheral surface of each photosensitive drum 11 is uniformly, electrically charged by the charger 12. The electrically charged peripheral surface of each photosensitive drum 11 is irradiated with a laser beam corresponding to each color, which is based on the image data input from the aforementioned computer or the like and is radiated from the optical scanning device 4, so that an electrostatic latent image is formed on the peripheral surface of each photosensitive drum 11. A developer is supplied to the electrostatic latent image from the developing device 13, so that a yellow, magenta, cyan, or black toner image is formed on the peripheral surface of each photosensitive drum 11. The toner images are superimposed together and transferred to the transfer belt 5 by a transfer bias applied to the primary transfer roller 14.

Reference numeral 16 indicates a secondary transfer roller disposed below the fixing unit 8. The secondary transfer roller 16 is in contact with the transfer belt 5. A sheet P conveyed along a sheet conveyance path 17 from the sheet storage unit 6 or the manual sheet feed unit 7 passes between the secondary transfer roller 16 and the transfer belt 5. In this process, the toner images on the transfer belt 5 are transferred to the sheet P by a transfer bias applied to the secondary transfer roller 16.

The fixing unit 8 has a heat roller 18 and a pressure roller 19, and heats and presses the sheet P with the sheet P interposed between the heat roller 18 and the pressure roller 19, thereby fixing the toner images transferred on the sheet P to the sheet P. The sheet P subjected to the fixing process is discharged to the sheet discharge unit 9. Reference numeral 20 indicates a reverse conveyance path which is used in duplex printing to reverse the sheet P discharged from the fixing unit 8.

[Configuration of Optical Scanning Device 4]

Next, the configuration of the optical scanning device 4 is generally described with reference to FIGS. 2 to 4.

Figure 2:
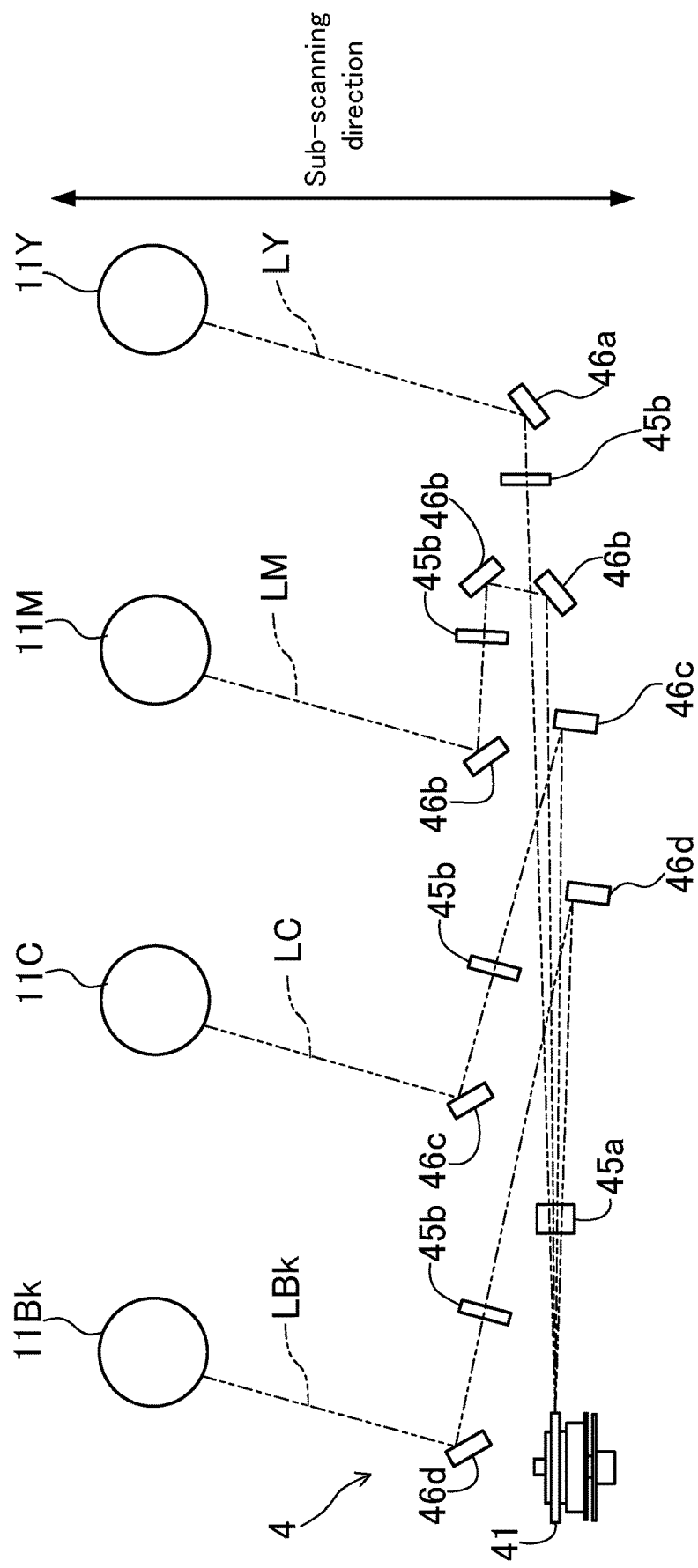
FIG. 2 is an optical path diagram illustrating a structure of an image-formation optical system of an optical scanning device in a sub-scanning cross section of the optical system (a plane corresponding to a cross section including an optical axis of the optical system and a sub-scanning direction)

As shown in FIG. 2, the optical scanning device 4 scans a light beam LY for yellow, a light beam LM for magenta, a light beam LC for cyan, and a light beam LBk for black on the peripheral surfaces of the photosensitive drums 11Y, 11M, 11C, and 11Bk, respectively, so that an electrostatic latent image is formed thereon.

Figure 3:
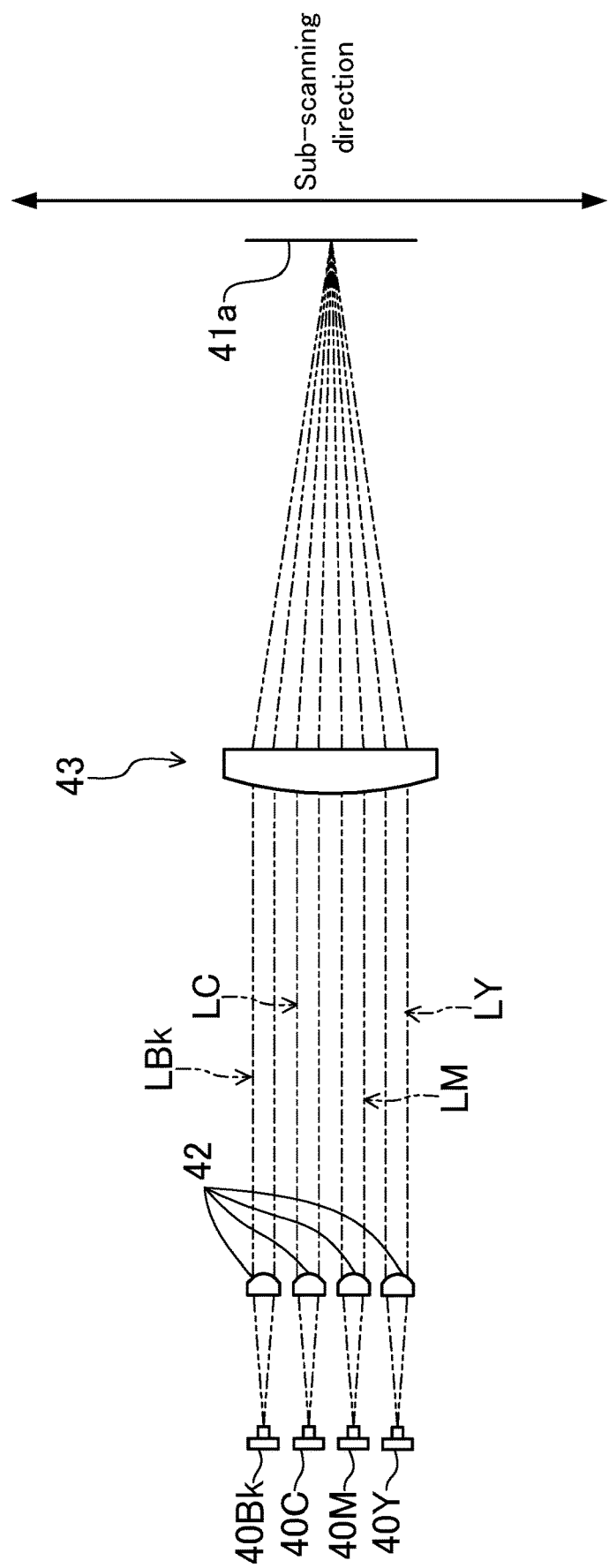
FIG. 3 is an optical path diagram illustrating a structure of an incidence optical system of the optical scanning device in a sub-scanning cross section of the optical system.
Figure 4:
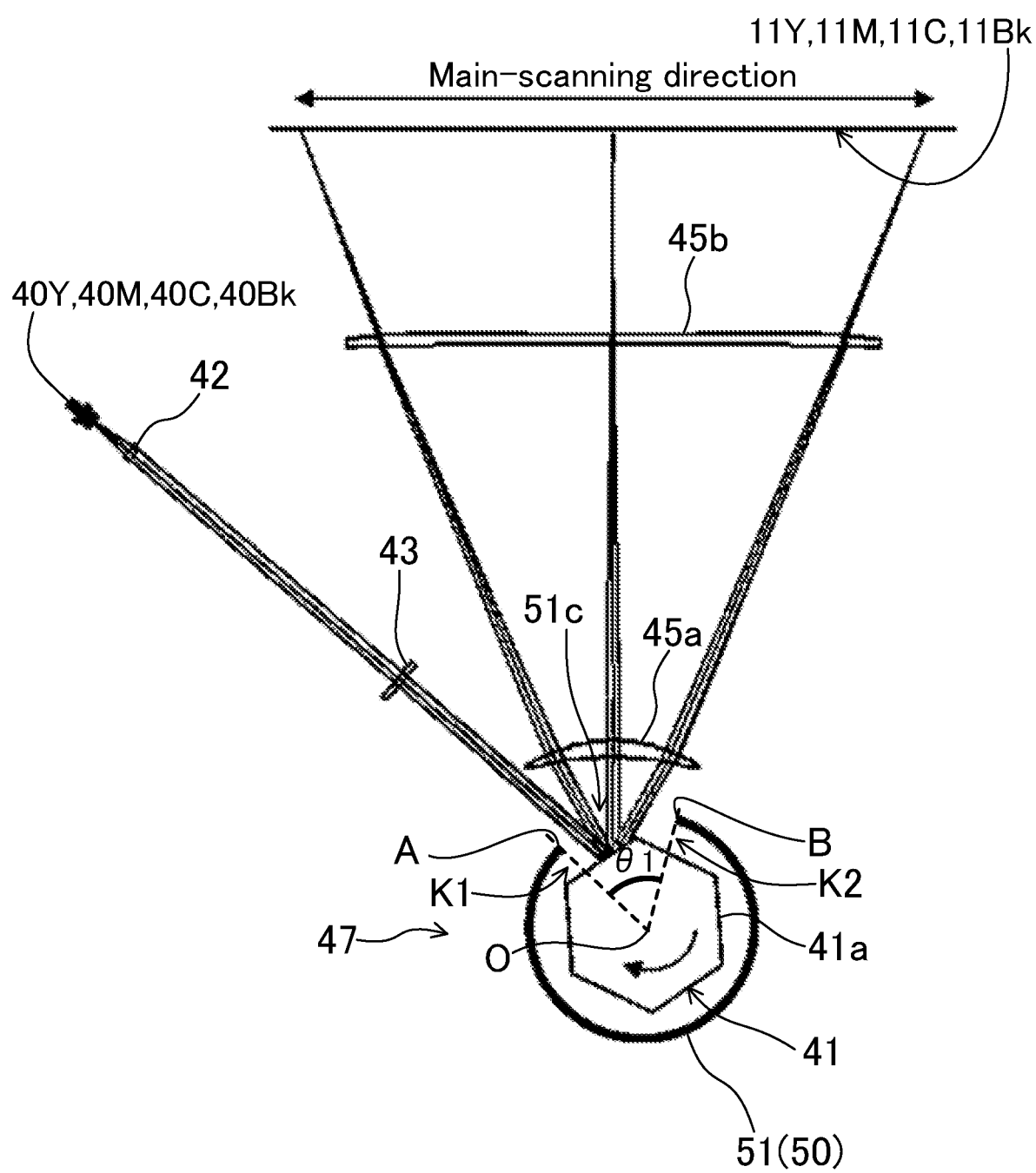
FIG. 4 is an optical path diagram illustrating the structure of the incidence optical system of the optical scanning device in a main-scanning cross section of the optical system (a plane corresponding to a cross section perpendicular to the sub-scanning direction)

The optical scanning device 4 has an incidence optical system including light sources 40Y, 40M, 40C, and 40Bk respectively emitting the light beams LY, LM, LC, and LBk (see FIGS. 3 and 4), one polygon mirror 41 shared for the four light beams LY, LM, LC, and LBk, and an image-formation optical system for forming an image of each light beam LY, LM, LC, LBk deflected and scanned by the polygon mirror 41 on the peripheral surface of the corresponding photosensitive drum 11Y, 11M, 11C, 11Bk and scanning the light beam LY, LM, LC, LBk on the peripheral surface of the photosensitive drum 11Y, 11M, 11C, 11Bk (see FIGS. 2 and 4).

As shown in FIGS. 3 and 4, the incidence optical system includes four collimator lenses 42 respectively provided with respect to the light sources 40Y, 40M, 40C, and 40Bk, an aperture (not illustrated) adjusting the light beams LY, LM, LC, and LBk having passed through the collimator lenses 42 to a predetermined optical path width, and a cylindrical lens 43 focusing the light beams LY, LM, LC, and LBk having passed through the aperture onto a deflecting surface 40a of the polygon mirror 41.

As shown in FIG. 2, the image-formation optical system includes a first image forming lens 45a disposed at a optical-path downstream side of the polygon mirror 41, a plurality of second image forming lenses 45b, and turning mirrors 46a to 46d. Each image forming lens 45a, 45b is composed of, for example, fθ lens.

The operation of the thus-configured optical scanning device 4 is described with reference to FIGS. 2 to 4. As shown in FIG. 3, the light beams LY, LM, LC, and LBk emitted from the light sources 40Y, 40M, 40C, and 40Bk are collimated by the collimator lenses 42, and then made incident on the cylindrical lens 43. The light beams LY, LM, LC, and LBk made incident on the cylindrical lens 43 are emitted in the form of collimated light beams in a main-scanning cross section (a cross section perpendicular to a sub-scanning direction) and in the form of convergent light beams in a sub-scanning cross section (a cross section extending along the sub-scanning direction), and made obliquely incident on the deflecting surface 41a of the polygon mirror 41 so that images thereof are formed thereon. In this process, in order to facilitate separation of the optical paths of the four light beams LY, LM, LC, and LBk deflected by the polygon mirror 41, the light beams LY, LM, LC, and LBk are made incident at different angles on the deflecting surface 41a as seen in the sub-scanning cross section (see FIG. 3).

As shown in FIG. 4, the light beams LY, LM, LC, and LBk made incident on the deflecting surface 41a of the polygon mirror 41 are each scanned at a constant angular velocity by the polygon mirror 41, and then converted into a constant-velocity scanning light by the first image forming lens 45a. The light beams LY, LM, LC, and LBk having passed through the first image forming lens 45a are each reflected by one or more turning mirrors 46a to 46b disposed in their respective optical paths (see FIG. 2), and they are respectively guided to the peripheral surfaces of the photosensitive drums 11Y, 11M, 11C, and 11Bk through the second image forming lenses 45b.

[Configuration of Optical Deflector 47]

Figure 5:
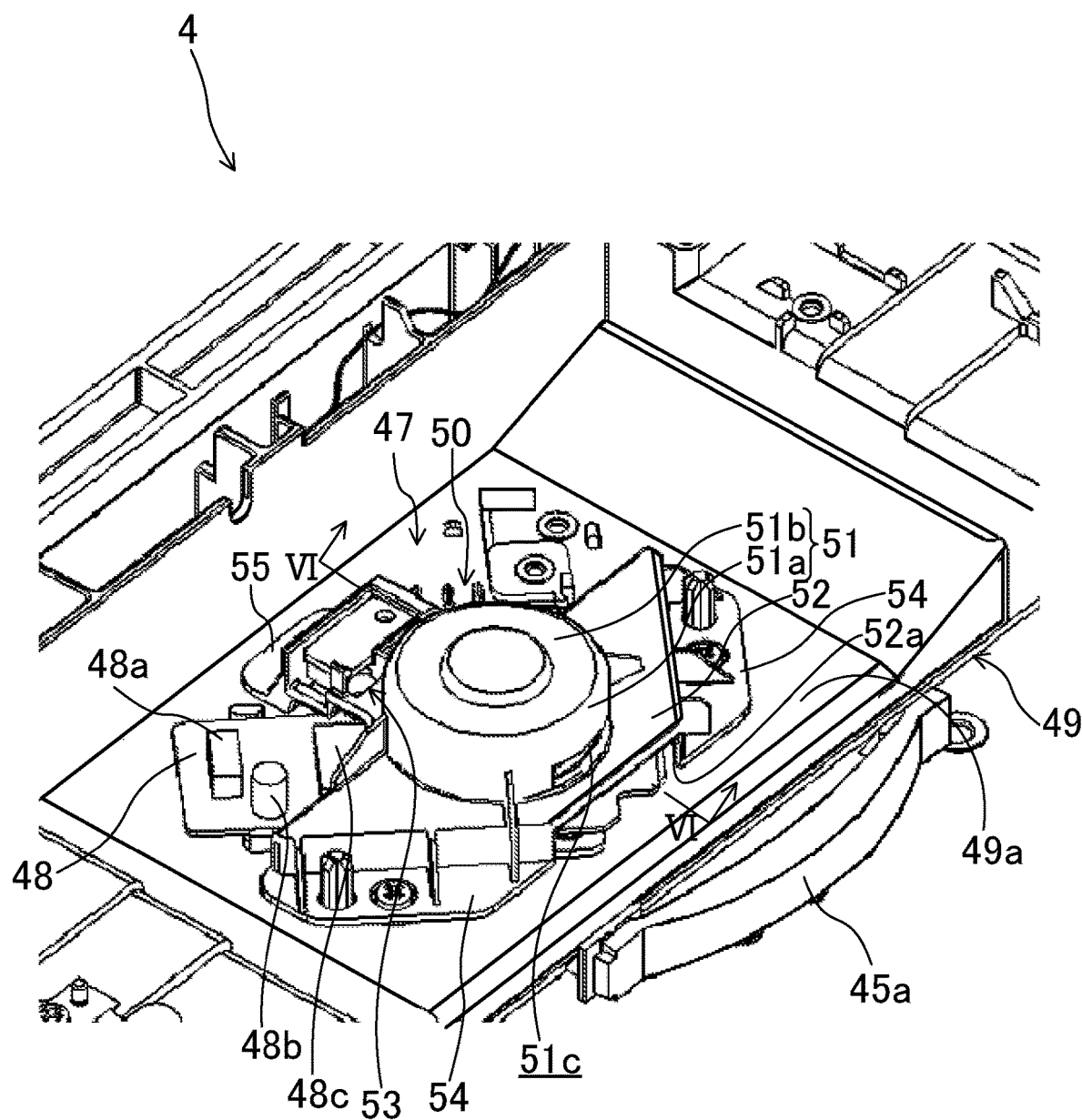
FIG. 5 is a perspective view of a schematic configuration of an optical deflector.
Figure 6:
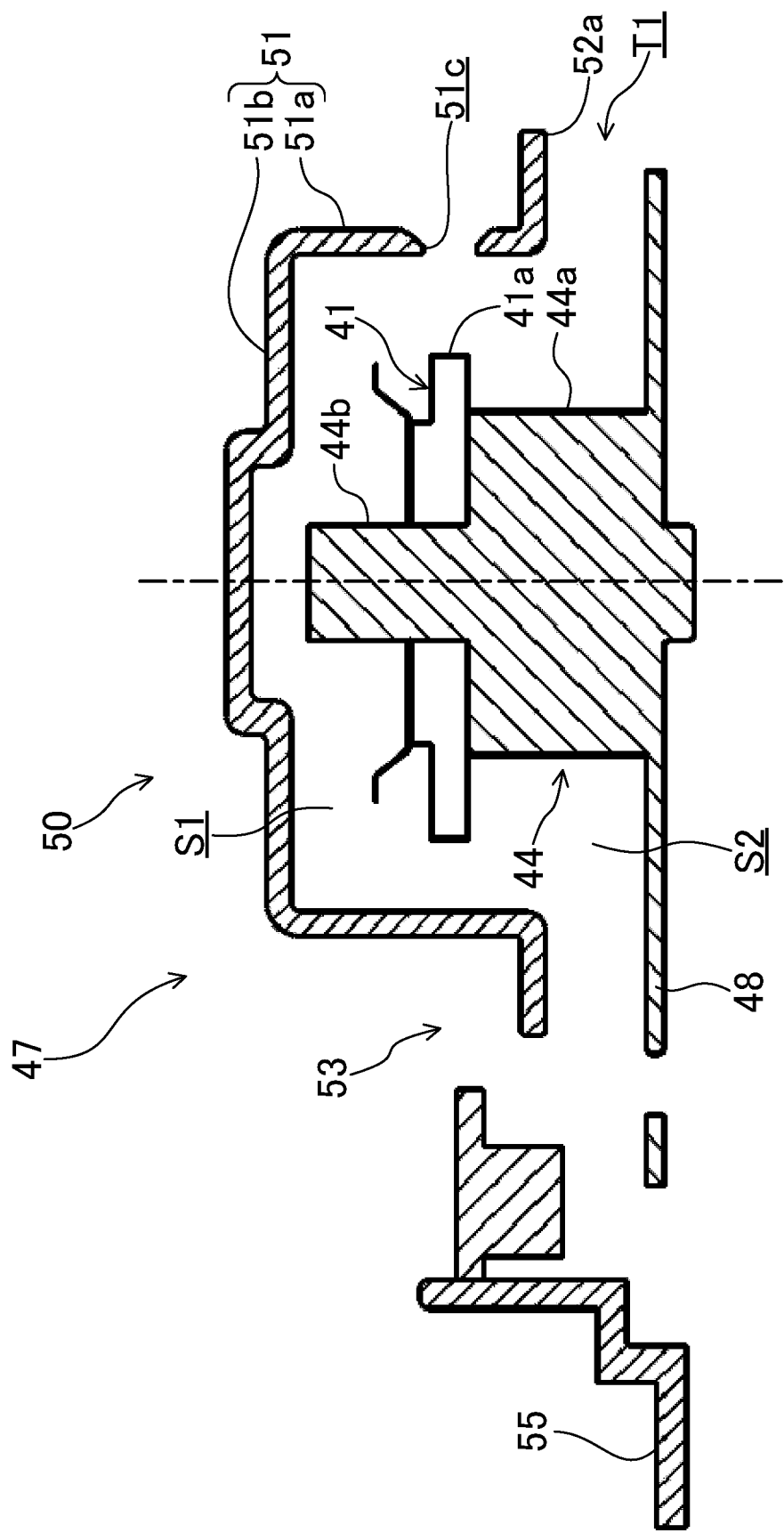
FIG. 6 is a sectional view taken along line VI-VI in FIG. 5.

As shown in FIGS. 5 and 6, the polygon mirror 41 is united with a drive motor 44 (illustrated only in FIG. 6) and a board 48 to constitute one optical deflector 47. Further, the optical deflector 47 has a cover member 50 covering the polygon mirror 41.

The optical deflector 47 is enclosed in an optical housing 49 that forms an outer wall of the optical scanning device 4. As shown in FIG. 5, the optical housing 49 has a flat mount surface 49a therein. The optical deflector 47 is fixed to the mount surface 49a.

As illustrated in FIG. 6, the drive motor 44 includes a cylindrical motor body 44a and a drive shaft 44b. The drive shaft 44b protrudes upward from the top of the motor body 44a.

The motor body 44a is fixed to the board 48. The board 48 has a connector 48a, a capacitor 48b, an integrated circuit 48c for driving, etc. (see FIG. 8) mounted thereon. The board is fixed to the mount surface 49a of the optical housing 49.

As shown in FIG. 4, the polygon mirror 41 is a polygonal mirror having a regular hexagonal cross section. The polygon mirror 41 has six deflecting surfaces 41a that respectively correspond to six sides of the regular hexagon. The light beams LY, LM, LC, and LBk emitted from the light sources 40Y, 40M, 40C, and 40Bk are applied to the deflecting surfaces 41a. The polygon mirror 41 is mounted to the upper end of the drive shaft 44b so as to rotate together with the drive shaft 44b.

[Configuration of Cover Member 50]

As illustrated in FIG. 5, the cover member 50 is fixed to the mount surface 49a of the optical housing 49 to cover the polygon mirror 41 and the drive motor 44. The cover member 50 functions to prevent noises caused by rotation of the polygon mirror 41 and to prevent dust and the like from adhering to the polygon mirror 41.

The cover member 50 has a first cover part 51, a second cover part 52, and an extending part 53. As shown in FIG. 6, the first cover part 51 covers the polygon mirror 41 from above to define a first space S1 in which the polygon mirror 41 is disposed. The first cover part 51 has a peripheral wall 51a having a circular cross section and surrounding the polygon mirror 41, and a top plate 51b closing the top of the peripheral wall 51a.

Figure 7:
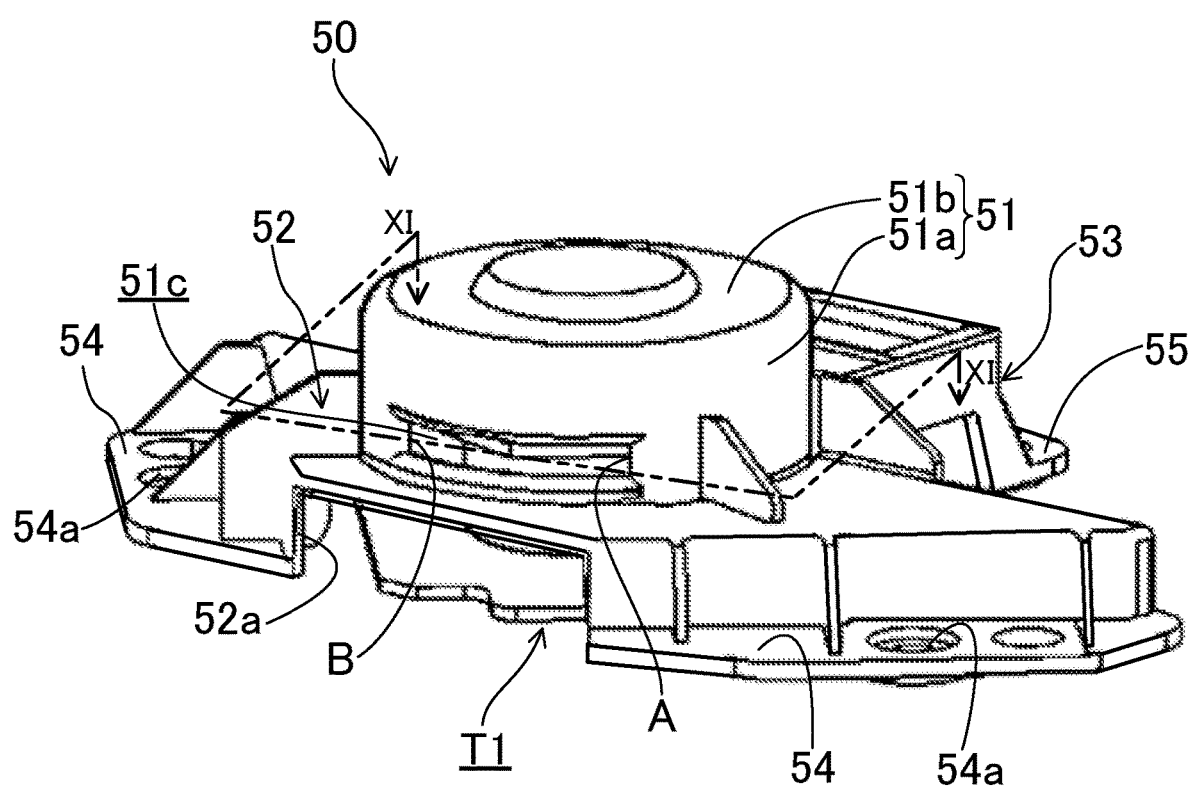
FIG. 7 is a perspective view of a cover member as viewed from an opening side.

As shown in FIG. 7, the peripheral wall 51a of the first cover part 51 has a rectangular opening 51c formed therein which extends in the circumferential direction. The opening 51c guides the light beams LY, LM, LC, and LBk emitted from the light sources 40 to the inside of the first cover part 51 and guides the light beams LY, LM, LC, and LBk deflected by the deflecting surfaces 41a of the polygon mirror 41 to the outside of the first cover part 51. The opening 51c also serves as an opening through which a flow of air generated by rotation of the polygon mirror 41 passes. The opening 51c is described in detail later.

The second cover part 52 has a flat-case shape which is trapezoidal in plan view. The second cover part 52 defines a second space S2 in which the motor body 44a of the drive motor is enclosed (see FIG. 6). The second cover part 52 is joined to the first cover part 51. The bottom of the first cover part 51 is entirely opened, so that the first space S1 in the first cover part 51 continuously communicates with the second space S2 in the second cover part 52.

The second cover part 52 that has a trapezoidal shape in plan view is arranged such that the shorter one of the parallel sides of the trapezoid faces the first image forming lens 45a. A wall extending downward from the shorter side of the second cover part 52 has a rectangular cutout 52a formed therein which is opened at the lower side thereof. This cutout 52a and the mount surface 49a form a rectangular opening T1. The opening T1 communicates between the inside and the outside of the second space S2.

Figure 8:
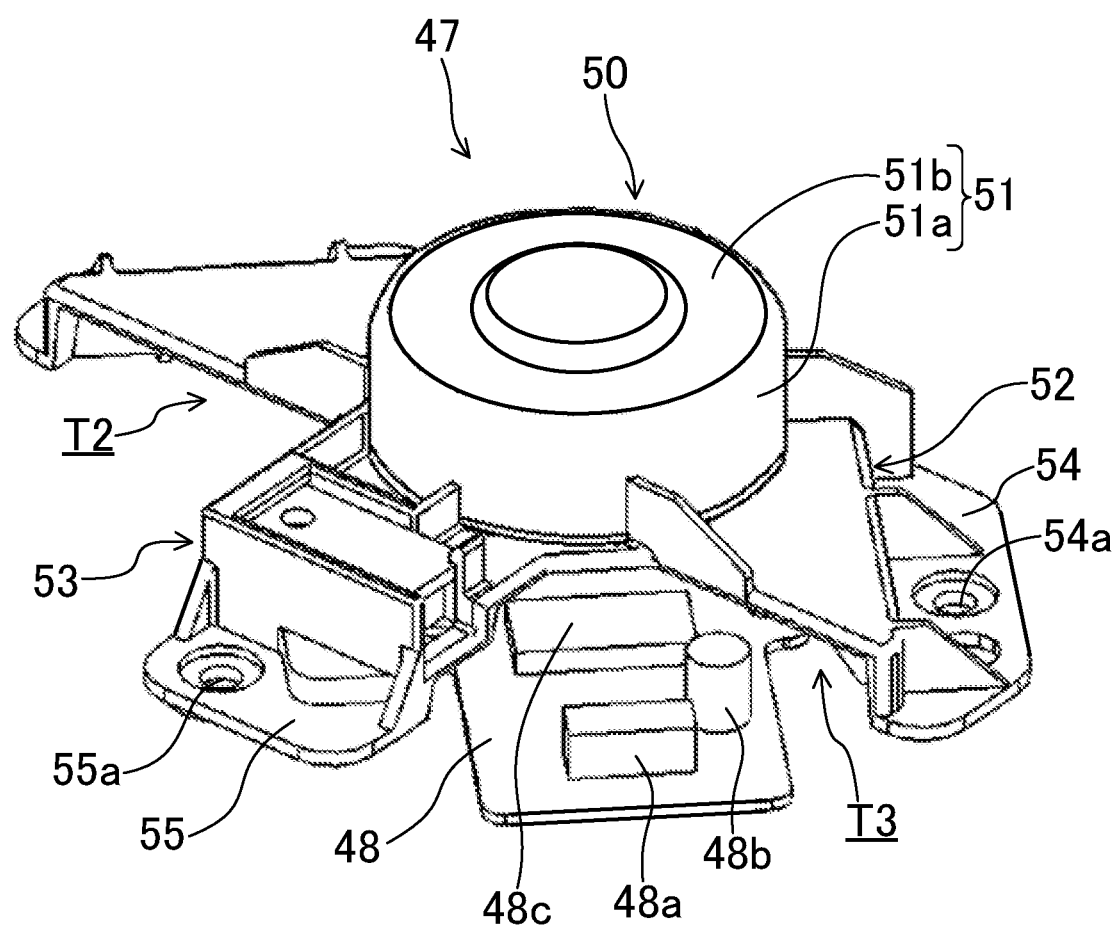
FIG. 8 is a perspective view of the cover member as viewed from the opposite side to the opening side.

As shown in FIG. 8, the extending part 53 is formed on the opposite side to the first image forming lens 45a side of the second cover part 52. The extending part 53 is joined to the center of the side of the second cover part 52. An opening T2 and an opening T3 are respectively formed at both sides of the extending part 53. The openings T2 and T3 function to cause a flow of air generated by rotation of the polygon mirror 41 to pass therethrough. This function enables the drive motor 44 driving the polygon mirror 41 as well as electronic components around the drive motor 44 to be cooled.

Side walls of the second cover part 52 corresponding to the pair of oblique sides of the trapezoid are each bent so as to form a plate-shaped bracket 54. The bracket 54 has an attachment hole 54a formed therein. The extending part 53 also has a plate-shaped bracket 55. The bracket 55 has an attachment hole 55a formed therein. The cover member 50 is fixed to the mount surface 49a by bolts inserted in the attachment holes 54a and 55a.

[Variation of Pressure of Air Inside First Cover Part 51]

Referring to FIG. 4, when the polygon mirror 41 rotates, the air inside the first cover part 51 is pushed in the rotating direction by the vertices of the polygon mirror 41. The air is blown out of the first cover part 51 through a first clearance K1 between a first opening end A of the opening 51c and the deflecting surfaces 41a of the polygon mirror 41. Further, air is sucked into the first cover part 51 through a second clearance K2 between a second opening end B of the opening 51c and the deflecting surfaces 41a of the polygon mirror 41.

The first clearance K1 and the second clearance K2 are varied by rotation of the polygon mirror 41 since the peripheral wall 51a of the first cover part 51 has a circular cross section and the polygon mirror 41 has a regular hexagonal cross section.

Figure 9:
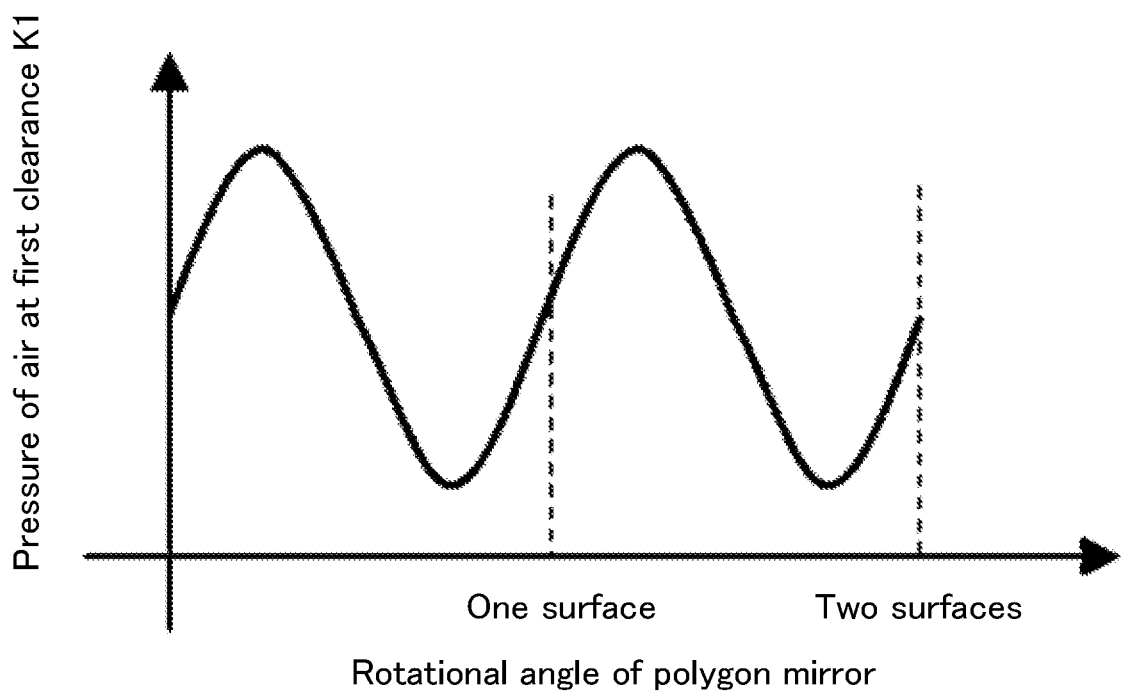
FIG. 9 is a diagram showing variation of the pressure of air (first pressure) between a deflecting surface of a polygon mirror and a first opening end of the opening (first clearance K1)
Figure 10:
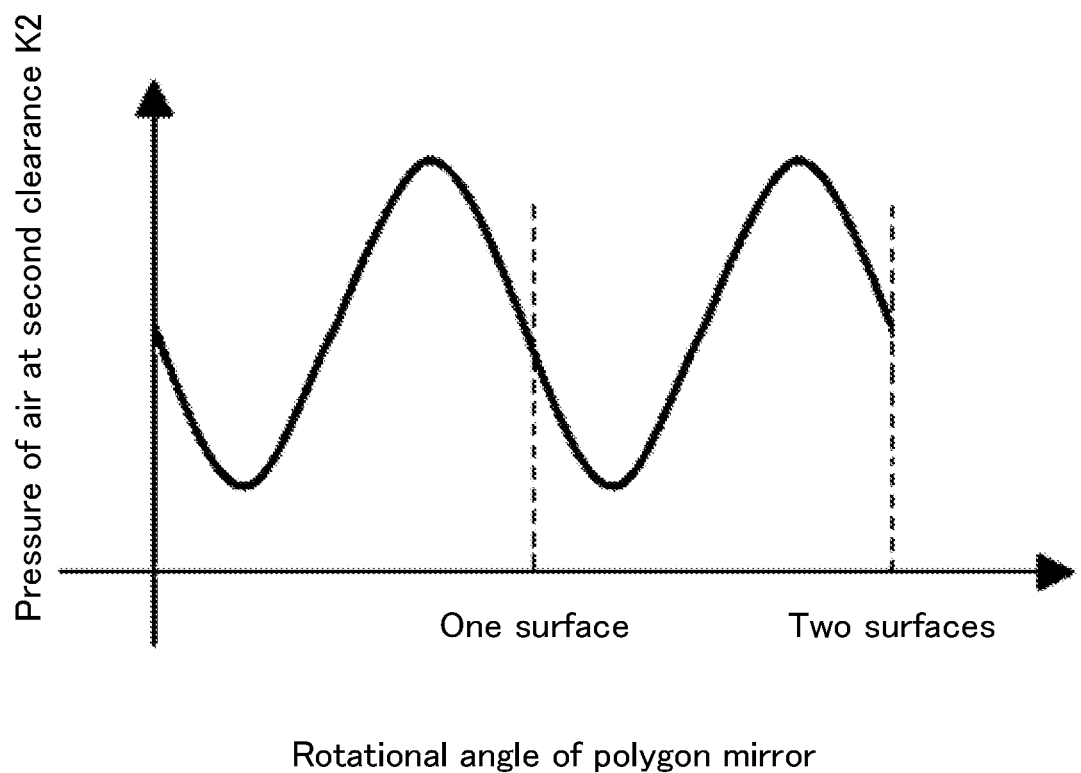
FIG. 10 is a diagram showing variation of the pressure of air (second pressure) between a deflecting surface of the polygon mirror and a second opening end of the opening (second clearance K2)

Therefore, the pressure of air between the first opening end A of the opening 51c and the deflecting surfaces 41a of the polygon mirror 41 (i.e., air in the first clearance K1), which pressure is hereinafter referred to as "first pressure", varies cyclically with rotation of the polygon mirror 41 (see FIG. 9). Further, the pressure of air between the second opening end B of the opening 51c and the deflecting surfaces 41a of the polygon mirror 41 (i.e., air in the second clearance K2), which pressure is hereinafter referred to as "second pressure", varies cyclically with rotation of the polygon mirror 41 (see FIG. 10). The first pressure and the second pressure are each subjected to one-cycle variation during each one-surface rotation of the polygon mirror 41 (each 60° rotation of the polygon mirror 41).

Embodiment 1 of Noise Prevention Structure of Optical Deflector 47

The peripheral wall 51a of the first cover part 51 covering the polygon mirror 41 has the opening 51c formed therein which lets noises generated by rotation of the polygon mirror 41 leak out of first cover part 51 through the opening 51c. Therefore, in this embodiment, such noises are reduced by applying an inventive idea to the arrangement and structure of the first cover part 51 and the structure of the opening 51c.

Figure 11:
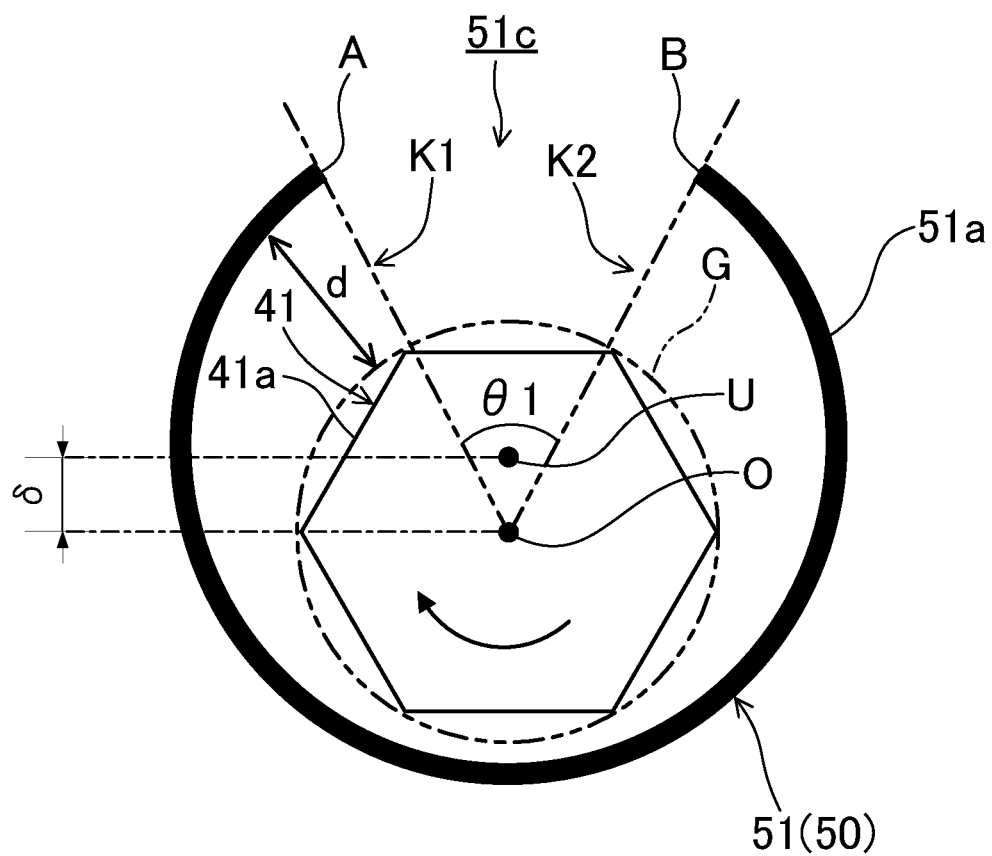
FIG. 11 is a sectional view taken along line XI-XI in FIG. 7.

Specifically, as shown in FIG. 11, the optical deflector is configured such that a distance d between a circumscribed circle G of the polygon mirror 41 and an inner peripheral surface of the peripheral wall 51a of the first cover part 51 in the radial direction of the polygon mirror 41 is largest at both circumferential ends of the opening 51c (i.e., at the first opening end A and at the second opening end B). To realize this configuration, in this embodiment, an axis U of the peripheral wall 51a of the first cover part 51 is positioned so as to be shifted to the opening 51c side from an axis O of the polygon mirror 41 by a predetermined distance δ.

This configuration enables the first clearance K1 and the second clearance K2 to be wider than in the case where the axis U of the peripheral wall 51a of the first cover part 51 is coincident with the axis O of the polygon mirror 41. Thereby, the amplitude of the variation of the pressure of air passing through each clearance K1, K2 is reduced. Consequently, noises caused by the pressure variation are reduced.

Further, as shown in FIG. 11, the opening 51c is formed such that an opening angle θ1 of the opening 51c centered on the axis O of the polygon mirror 41 satisfies Equation 1 below:

$$\theta 1 \fallingdotseq (360°/\text{the number of surfaces of the polygon mirror 41}) \times n \quad (1),$$

where n is a natural number less than the number of surfaces of the polygon mirror 41.

FIG. 11 shows a cross section of the peripheral wall 51a of the first cover part 51, which is a cross section perpendicular to the axial direction of the polygon mirror 41, i.e., a main-scanning cross section, with n being 1. Since the number of surfaces of the polygon mirror 41 is 6, θ1≒60° is obtained on the basis of Equation (1) above. Therefore, the opening angle θ1 in this embodiment is set to 60°. When the opening angle θ1 of the opening 51c is 60°, a reduced noise level is achieved. The reasons therefor are as follows.

[A] The opening 51c is formed such that the opening angle θ1 satisfies Equation (1); therefore, as shown in FIG. 11, when one of the six vertices of the polygon mirror 41 is positioned in the vicinity of the first opening end A, another one of the vertices is positioned in the vicinity of the second opening end B. When the middle of a pair of adjacent vertices of the polygon mirror 41 is positioned in the vicinity of the opening end A, the middle of another pair of adjacent vertices is positioned in the vicinity of the opening end B.

[B] That is to say, the first clearance K1 and the second clearance K2 always have substantially the same length during rotation of the polygon mirror 41, and the first pressure and the second pressure therefore show substantially the same value (absolute value). However, since the first clearance K1 allows air to be blown out of the first cover part 51 and, in contrast, the second clearance K2 allows air to be sucked into the first cover part 51, the variation of the first pressure and the variation of the second pressure are shifted in phase from each other by 180° (0.5 cycle) (see FIGS. 9 and 10).

[C] Therefore, a sound generated at the air outlet in the vicinity of the first clearance K1 and a sound generated at the air inlet in the vicinity of the second clearance K2 are also shifted in phase from each other by 180°. As a result thereof, these sounds cancel out each other, so that a reduced noise level is achieved. Thus, noises generated by rotation of polygon mirror 41 are sufficiently reduced even though the first cover part 51 is a non-sealed type.

Figure 12:
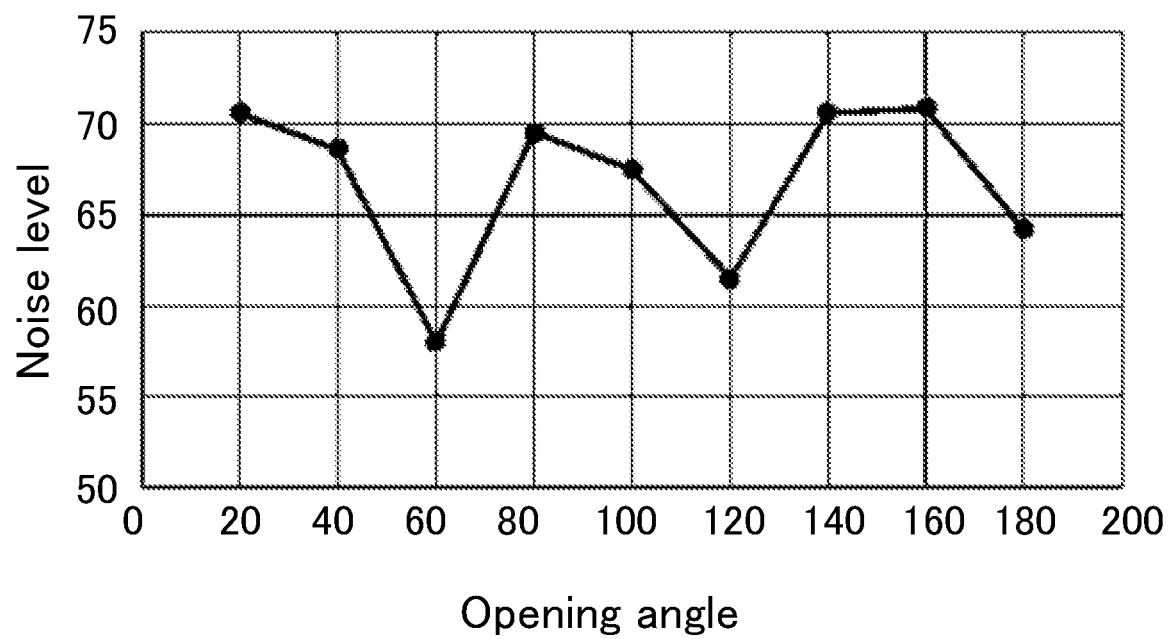
FIG. 12 is a diagram showing a relation between an opening angle of the opening and a noise level.

When n is 2, θ1 is 120°. When n is 3, θ1 is 180°. When n is a natural number less than the number of surfaces of the polygon mirror 41, i.e., 2, 3, . . . , the same actions and effects as those described as [A]-[C] above are provided. That is to say, when the opening 51c is formed such that the opening angle θ1 satisfies Equation (1) above, a reduced noise level is obtained. As shown in FIG. 12, the inventors conducted an experiment to confirm that a reduced noise level was achieved when the opening angle θ1 was 60°, 120°, or 180°.

Figure 13:
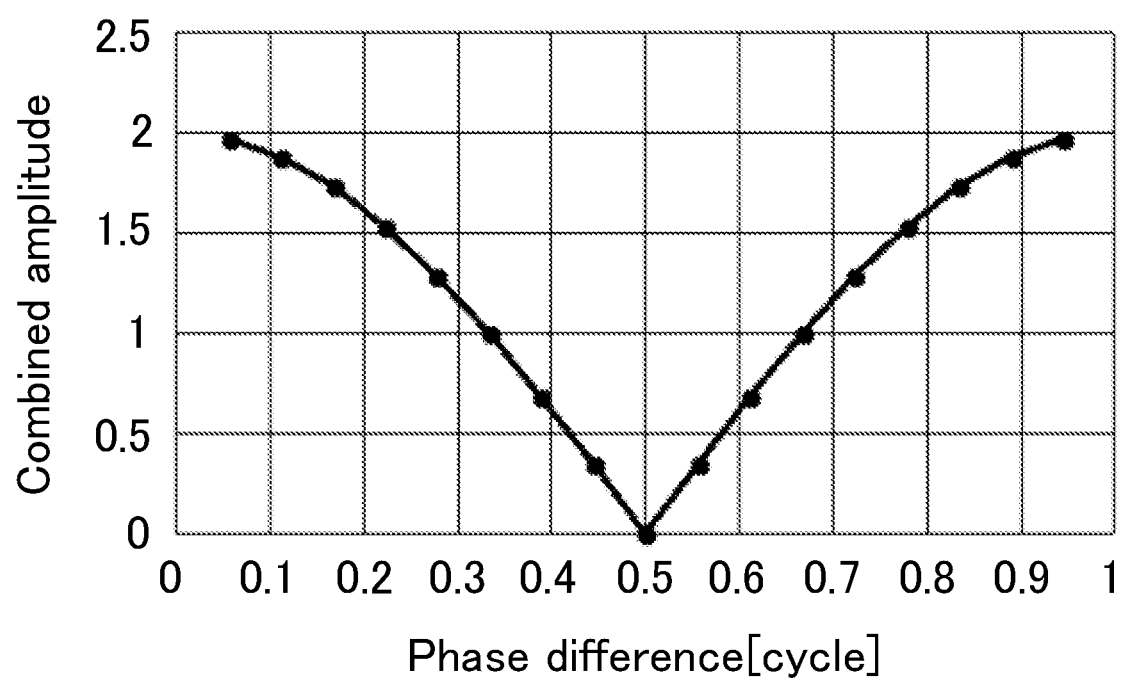
FIG. 13 is a diagram showing a relation between a combined amplitude and a phase difference (a phase difference between a first waveform representing the variation of the first pressure and a second waveform representing the variation of the second pressure)

FIG. 13 shows the relation between a combined amplitude and a phase difference (a phase difference between a first waveform representing the variation of the first pressure and a second waveform representing the variation of the second pressure). The combined amplitude means the amplitude of a waveform obtained by combining the first waveform and the second waveform. The amplitudes of the first and second waveforms (the aptitudes of the fundamental waveforms) are each 1.

In FIG. 13, the combined amplitude is smaller than the amplitudes of the fundamental waveforms, i.e., smaller than 1, in the range where the phase difference is 0.33 cycle to 0.67 cycle. When the phase difference is 0.5 cycle as in this embodiment, the combined amplitude is smallest; therefore, the noise level is smaller than those of the noise caused by the first pressure and the noise caused by the second pressure.

That is to say, in this embodiment, the phase difference between the first waveform representing the variation of the first pressure (see FIG. 9) and the second waveform representing the variation of the second pressure (see FIG. 10) is determined such that the amplitude of the combined waveform of the first waveform and the second waveform is smaller than both the amplitude of the first waveform and the amplitude of the second waveform. Further, the opening angle θ1 of the opening 51c is set to an angle corresponding to the thus-determined phase difference (in this embodiment, 60°).

Modification of Embodiment 1

The opening 51c may be formed such that the opening angle θ1 of the opening 51c centered on the axis O of the polygon mirror 41 satisfies Equations (2) and (3) below:

$$\theta 1 > ((360°/\text{the number of surfaces of the rotary polyhedron}) \times n) \times 0.83 \quad (2)$$

$$\theta 1 < ((360°/\text{the number of surfaces of the rotary polyhedron}) \times n) \times 1.17 \quad (3),$$

where n is a natural number less than the number of surfaces of the polygon mirror 41.

When n is 1, 49.8°<θ1<70.2° is obtained on the basis of Equations (2) and (3) (the number of surfaces of the polygon mirror 41 is 6). In the range of 49.8°<θ1<70.2°, a reduced noise level is achieved. The reasons therefor are as follows.

Equations (2) and (3) mean that the opening angle θ1 of the opening 51c is in a range of plus or minus 17% with respect to the opening angle θ1 of the opening 51c in Embodiment 1 above. This means that the phase difference between the first waveform representing the variation of the first pressure and the second waveform representing the variation of the second pressure in this modification is increased by 0.17 cycle and decreased by 0.17 cycle with respect to the phase difference in Embodiment 1 above. In the range of 49.8°<θ1<70.2°, the two waveforms show a phase difference of 0.33-0.67 cycle since the phase difference in Embodiment 1 above is 0.5 cycle.

As seen from FIG. 13, in the range where the phase difference is in the range of 0.33-0.67 cycle, the combined amplitude is smaller than the amplitudes of the fundamental waveforms, i.e., smaller than 1; therefore, the noise level is smaller than those of the noise caused by the first pressure and the noise caused by the second pressure. Thus, in this modification, the noises generated by rotation of the polygon mirror 41 are sufficiently reduced even though the first cover part 51 is a non-sealed type.

Embodiment 2

Figure 14:
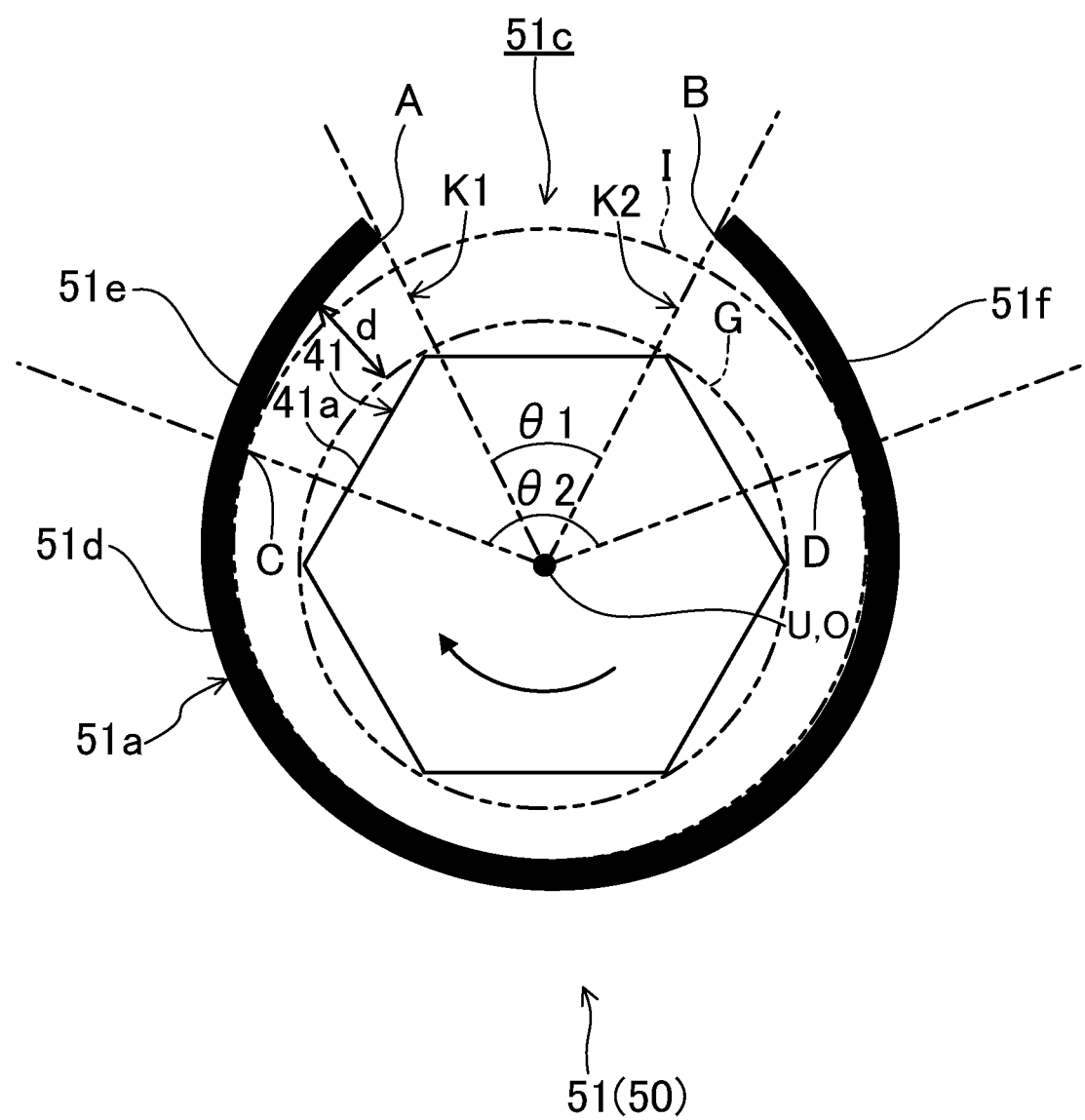
FIG. 14 is a diagram corresponding to FIG. 11, wherein Embodiment 2 is shown.

FIG. 14 shows Embodiment 2. Embodiment 2 is different from Embodiment 1 in the structure for causing the distance d to be largest at the circumferential ends of the opening 51c.

That is to say, in Embodiment 2, the peripheral wall 51a of the first cover part 51 is composed of an arcuate wall 51d having an arc-shaped cross section, a first joined wall 51e, and a second joined wall 51f. The first and second joined walls 51e and 51f are respectively joined to circumferential ends of the arcuate wall 51d.

The arcuate wall 51d is formed to surround the polygon mirror 41. The arcuate wall 51d has an axis U coincident with the axis O of the polygon mirror 41. That is to say, the arcuate wall 51d is formed coaxially with the polygon mirror 41.

The first joined wall 51e and the second joined wall 51f are formed to be bilaterally symmetrical in FIG. 14. The curvature of the first and second articulated walls 51e and 51f is smaller than that of the arcuate wall 51d.

The first joined wall 51e extends from one circumferential end toward the other circumferential end of the arcuate wall 51d and extends outside an inscribed circle I of the arcuate wall 51d in the radial direction. Similarly, the second joined wall 51f extends from the other circumferential end toward the one circumferential end of the arcuate wall 51d and extends outside the inscribed circle I of the arcuate wall 51d in the radial direction. The distal end of the first joined wall 51e forms one circumferential end (the first opening end A) of the opening 51c, while the distal end of the second articulated wall 51f forms the other circumferential end (the second opening end B) of the opening 51c.

This configuration enables the first clearance K1 and the second clearance K2 to be wider in the radial direction than in the case where the first and second joined walls 51e and 51f are formed to extend along the inscribed circle I. Thereby, the same actions and effects as those in Embodiment 1 above are achieved.

Further, differently from Embodiment 1, the axis U of the arcuate wall 51d of the first cover part 51 does not need to be eccentric to the axis O of the polygon mirror 41. Therefore, differently from Embodiment 1, the width of the air flow path (the distance between the inner peripheral surface of the peripheral wall 51 and the deflecting surfaces 41a of the polygon mirror 41) at the opposite side to the opening 51c side in the first cover part 51 is not narrowed. Therefore, the air flow path around the polygon mirror 41 has a sufficient width, which provides high heat dissipation in the first cover part 51.

Note that, for the same reasons as those in Embodiment 1, it is preferred that the opening angle $\theta 1$ of the opening 51c satisfies Equation (1) above. Further, for the same reasons as those in the above-described modification of Embodiment 1, the opening angle $\theta 1$ may be set to satisfy Equations (2) and (3).

In the thus-configured first cover part 51 according to Embodiment 2, the air flow separates at the boundary between the arcuate wall 51d and the first joined wall 51e (one end C of the arcuate wall 51d) and at the boundary between the arcuate wall 51d and the second joined wall 51f (the other end D of the arcuate wall 51d) because the curvature of the inner peripheral surface of the first cover part 51 changes there. Therefore, noises are likely to be generated there.

To solve this problem, in this embodiment, an angle $\theta 2$ formed by lines connecting each circumferential end of the arcuate wall 51d to the axis U of the arcuate wall 51d is set to satisfy Equation (4) below. In Equation (4), n is a natural number less than the number of surfaces of the polygon mirror 41.

$$\theta 2 \fallingdotseq (360°/\text{the number of surfaces of the polygon mirror 41}) \times n \quad (4)$$

Equation (4) is obtained by replacing $\theta 1$ with $\theta 2$ in Equation (1) that is used in Embodiment 1. When Equation (4) is satisfied, variation of the pressure of air at the one end C of the arcuate wall 51d and variation of the pressure of air at the other end D of the arcuate wall 51d cancel out each other. Therefore, generation of noises at the points where the curvature of the inner peripheral surface of the first cover part 51 changes is suppressed.

In the example shown in FIG. 14, $\theta 1$ is set to 60° on the basis of Equation (1), where n=1 and the number of surfaces of the rotary polyhedron is 6. On the other hand, $\theta 2$ is set to 120° on the basis of Equation (4), where n=2 and the number of surfaces of the rotary polyhedron is 6.

The angle $\theta 2$ may be set to satisfy Equations (5) and (6) below. In Equations (5) and (6), n is a natural number less than the number of surfaces of the polygon mirror 41.

$$\theta 2 > ((360°/\text{the number of surfaces of the rotary polyhedron}) \times n) \times 0.83 \quad (5)$$

$$\theta 2 < ((360°/\text{the number of surfaces of the rotary polyhedron}) \times n) \times 1.17 \quad (6)$$

Equations (5) and (6) are obtained by replacing $\theta 1$ with in Equations (2) and (3) that is used in the above-described modification of Embodiment 1. When $\theta 2$ is set in this range, a noise reduction effect is achieved on the same reasons as those in the above-described modification of Embodiment 1.

Modification 1 of Embodiment 2

Figure 15:
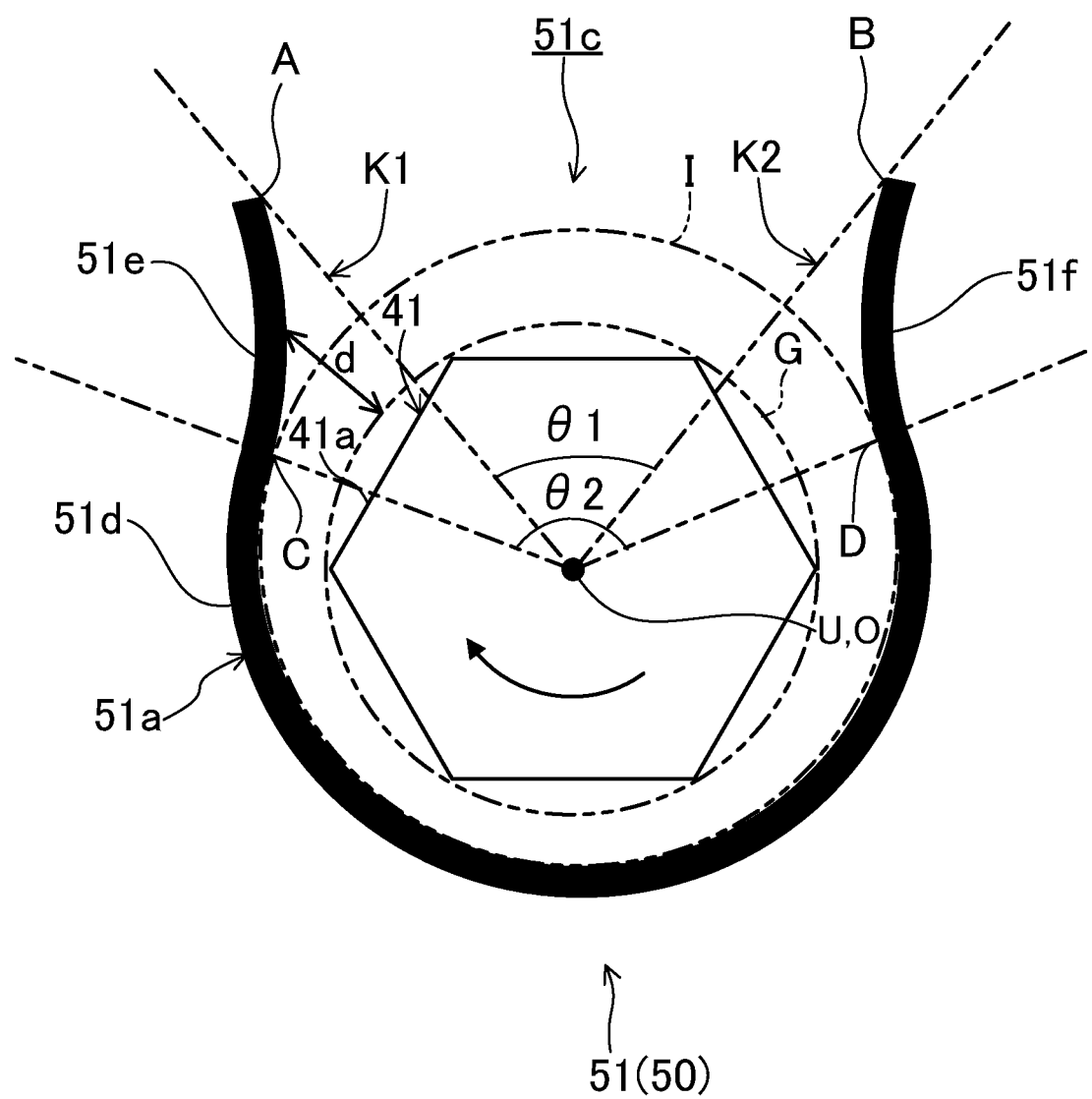
FIG. 15 is a diagram corresponding to FIG. 14, wherein Modification 1 of Embodiment 2 is shown.

FIG. 15 corresponds to FIG. 14 which shows Modification 1 of Embodiment 2 is shown. In the description below, components identical to those in FIG. 14 are denoted by the same reference numerals as those used in FIG. 14 so that the description thereof is omitted.

In this Modification 1, the first joined wall 51e and the second joined wall 51e are each curved in the direction opposite to the direction in which the arcuate wall 51d is curved. Further, the first joined wall 51e and the second joined wall 51f are formed to respectively extend from the ends of the arcuate wall 51d toward the top of FIG. 15 and to spread outward in the lateral direction (the main-scanning direction).

In the example shown in FIG. 15, $\theta 2$ is set to 120° on the basis of Equation (4), wherein n=2 and the number of surfaces of the rotary polyhedron is 6. $\theta 1$ is set to an angle which permits movement of a light beam in the main-scanning direction, such as an angle of 100 to 110°.

This configuration enables the first opening end A and second opening end B of the opening 51c to be located outside and greatly away from the inscribed circle I of the arcuate wall 51d in the radial direction. Therefore, the amplitude of the variation of the pressure of the air passing through each clearance K1, K2 is minimized, so that generation of noises is suppressed.

Further, this configuration enables the opening 51c to have a greater circumferential width, which prevents a light beam as scanning from hitting the circumferential ends of the opening 51c.

Note that, even when the opening angle θ1 of the opening 51c does not satisfy Equation (1) or Equations (2) and (3), noises caused by the flow of air passing through each clearance K1, K2 are so small as to be ignorable as compared with noises generated at each end C, D of the arcuate wall 51d because the first clearance K1 and the second clearance K2 are sufficiently wide. The noises generated at each end C, D of the arcuate wall 51d is sufficiently reduced when the angle θ2 satisfies Equation (4) or Equations (5) and (6).

Modification 2 of Embodiment 2

Figure 16:
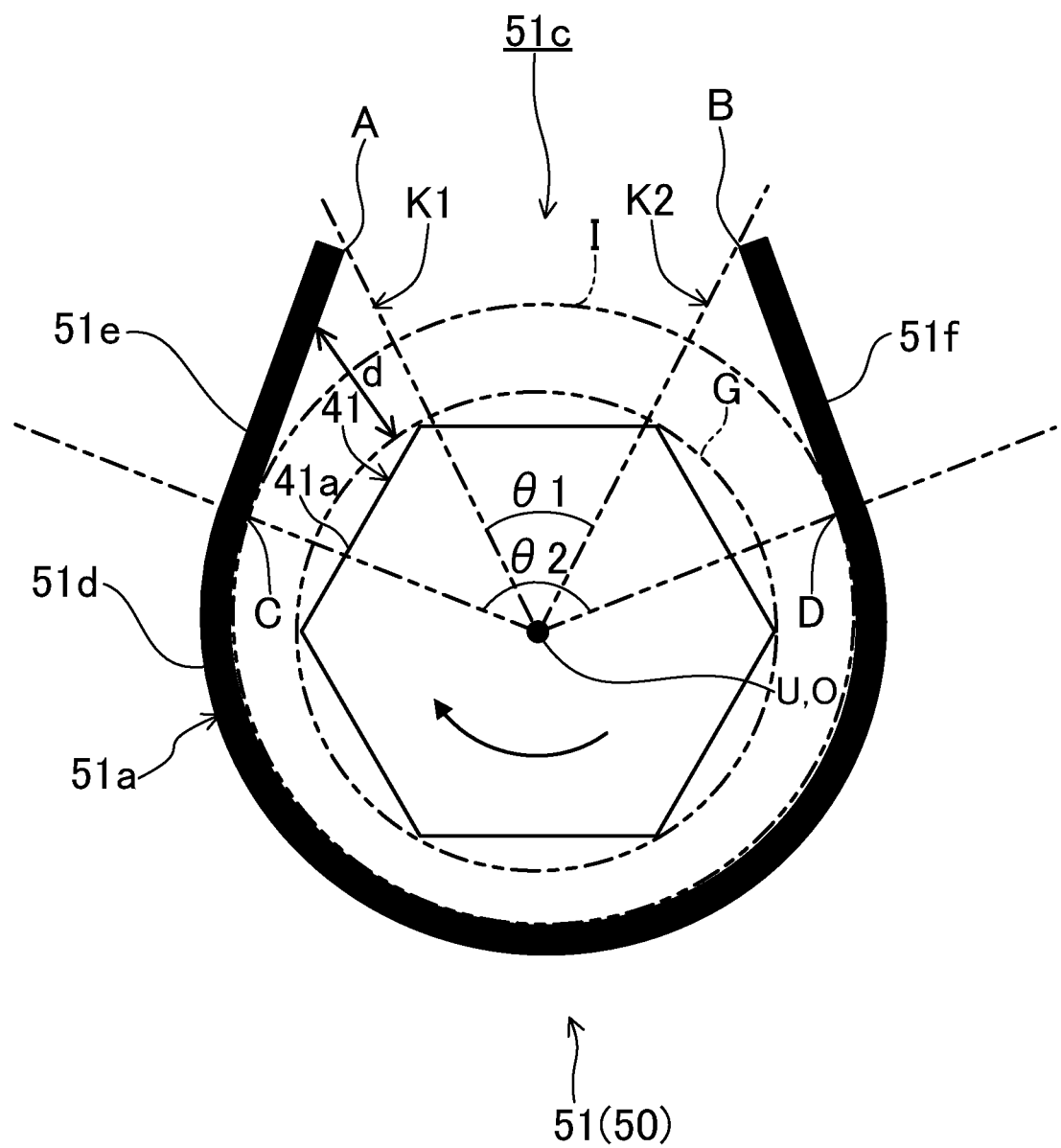
FIG. 16 is a diagram corresponding to FIG. 14, wherein Modification 2 of Embodiment 2 is shown.

FIG. 16 corresponds to FIG. 14 which shows Modification 2 of Embodiment 2.

In this modification, the first joined wall 51e and the second joined wall 51f are each linearly formed as viewed in the axial direction. Further, the first joined wall 51e and the second joined wall 51f each extend in the direction of a tangent line to the arcuate wall 51d as viewed in the axial direction. In the example shown in FIG. 16, θ1 is set to 60° on the basis of Equation (1), wherein n=1 and the number of surfaces of the rotary polyhedron is 6. On the other hand, θ2 is set to 120° on the basis of Equation (4), wherein n=2 and the number of surfaces of the rotary polyhedron is 6.

As compared with the configuration according to Embodiment 2 (the configuration shown in FIG. 14), the configuration according to Modification 2 enables the first opening end A and second opening end B of the opening 51c to be located outside and greatly away from the inscribed circle I of the arcuate wall 51d in the radial direction. Therefore, the amplitude of the variation of the pressure of the air passing through each clearance K1, K2 is minimized, so that generation of noises is suppressed.

Further, since the first joined wall 51e and the second joined wall 51f each extend in the direction of a tangent line to the arcuate wall 51d as viewed in the axial direction, the flow of air at each end C, D of the arcuate wall 51d is smoothed, so that generation of noises is suppressed.

Modification 3 of Embodiment 2

Figure 17:
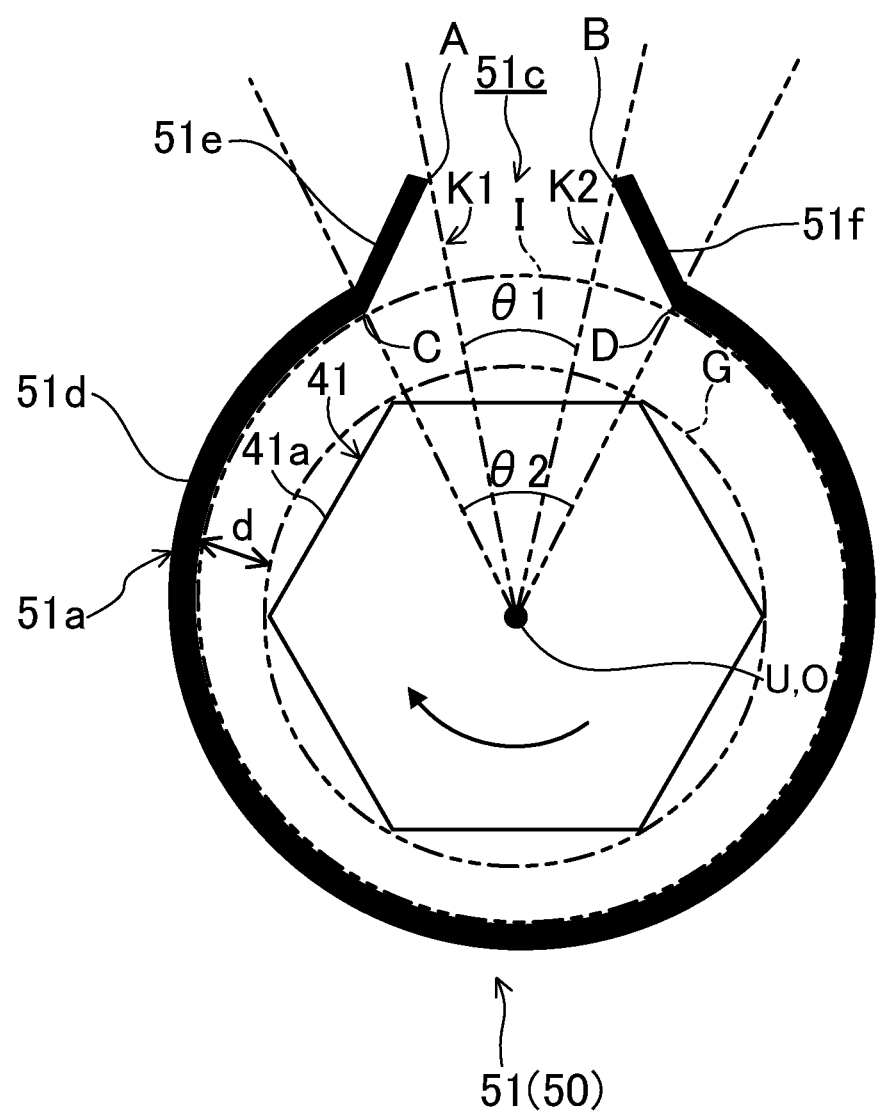
FIG. 17 is a diagram corresponding to FIG. 14, wherein Modification 3 of Embodiment 2 is shown.

FIG. 17 corresponds to FIG. 14 which shows Modification 3 of Embodiment 2.

In this modification, the first joined wall 51e and the second joined wall 51f are each linearly formed as viewed in the axial direction, and they are respectively coupled to the ends of the arcuate wall 51d such that they are bent from the ends of the arcuate wall 51d.

In the configuration according to Modification 3 of Embodiment 2, as compared with the configurations according to Modifications 1 and 2, the direction of the wall is suddenly changed at each end C, D of the arcuate wall 51d. Because of this, noises are likely to be generated at the ends C and D of the arcuate wall 51d. Therefore, applying the technology disclosed herein to the peripheral wall 51a having a shape as in this modification to determine the angle θ2 on the basis of Equations (4) to (6) is particularly helpful for suppressing noises. Note that, in the example shown in FIG. 17, θ1 is set to 30° and θ2 is set to 60°.

Other Embodiments

The technology disclosed herein encompasses the following configuration with respect to Embodiment 1.

The polygon mirror 41 in the above-described embodiments and the modifications thereof is formed to have a hexagonal cross section; however, the present disclosure is not limited to such a polygon mirror. For example, a polygon mirror having a pentagonal cross section is possible.

Further, the foregoing description describes an example where the optical deflector 47 is applied to the optical scanning device 4 installed in a printer; however, the present disclosure is not limited to the example. For example, the optical deflector 47 may be applied to, for example, a copying machine, a facsimile, or a multifunction peripheral/printer/product (MFP).

What is claimed is:

1. An optical deflector comprising:
a rotary polyhedron; and
a cover member covering the rotary polyhedron,
wherein the cover member has an opening facing a peripheral surface of the rotary polyhedron,
wherein the optical deflector is configured such that a light beam emitted from a light source is applied to the peripheral surface of the rotary polyhedron through the opening of the cover member and the rotary polyhedron deflects the light beam while rotating about an axis thereof to scan the light beam on an object to be irradiated through the opening,
wherein a distance between a circumscribed circle of the rotary polyhedron centered on the axis of the rotary polyhedron and an inner peripheral surface of a peripheral wall of the cover member in a radial direction of the rotary polyhedron is largest at both of circumferential ends of the opening,
wherein the peripheral wall of the cover member has a circular shape as viewed in an axial direction of the rotary polyhedron, and
wherein an axis of the peripheral wall of the cover member is eccentric with respect to the rotary polyhedron such that the distance is largest at both of the circumferential ends of the opening.

2. The optical deflector of claim 1, wherein an opening angle θ1 of the opening centered on the axis of the rotary polyhedron satisfies Equations (1) and (2) below:

$$\theta 1 > ((360°/\text{a number of surfaces of the rotary polyhedron}) \times n) \times 0.83 \quad (1)$$

$$\theta 1 < ((360°/\text{the number of surfaces of the rotary polyhedron}) \times n) \times 1.17 \quad (2),$$

where n is a natural number less than the number of surfaces of the rotary polyhedron.

3. The optical deflector of claim 1, wherein an opening angle θ1 of the opening centered on the axis of the rotary polyhedron satisfies Equation (1) below:

$$\theta 1 \approx (360°/\text{a number of surfaces of the rotary polyhedron}) \times n \quad (1),$$

where n is a natural number less than the number of surfaces of the rotary polyhedron.

4. An optical scanning device comprising:
the optical deflector of claim 1; and
the light source.

5. An image forming apparatus comprising:
the optical scanning device of claim 4; and
the object to be irradiated,
wherein the object to be irradiated is an image carrier having a surface on which an electrostatic latent image is to be formed.

6. An optical deflector comprising:
a rotary polyhedron; and a cover member covering the rotary polyhedron,
wherein the cover member has an opening facing a peripheral surface of the rotary polyhedron,
wherein the optical deflector is configured such that a light beam emitted from a light source is applied to the peripheral surface of the rotary polyhedron through the opening of the cover member and the rotary polyhedron deflects the light beam while rotating about an axis thereof to scan the light beam on an object to be irradiated through the opening,
wherein a distance between a circumscribed circle of the rotary polyhedron centered on the axis of the rotary polyhedron and an inner peripheral surface of a peripheral wall of the cover member in a radial direction of the rotary polyhedron is largest at both of circumferential ends of the opening,
wherein the peripheral wall of the cover member comprises an arcuate wall, a first joined wall, and a second joined wall, the arcuate wall being formed to have an arc shape coaxial with the rotary polyhedron as viewed in an axial direction of the rotary polyhedron, the first joined wall and the second joined wall being respectively joined to circumferential ends of the arcuate wall,
wherein a distal end of the first joined wall and a distal end of the second joined wall respectively constitute the circumferential ends of the opening,
wherein the first joined wall and the second joined wall respectively extend from the circumferential ends of the arcuate wall toward a radial outside of an inscribed circle of the arcuate wall such that the distance is largest at both of the circumferential ends of the opening, and wherein an angle $\theta 2$ formed by lines connecting each of the circumferential ends of the arcuate wall to the axis of the rotary polyhedron as viewed in the axial direction of the rotary polyhedron satisfies Equations (1) and (2) below:

$$\theta 2 > ((360°/\text{a number of surfaces of the rotary polyhedron}) \times n) \times 0.83 \quad (1)$$

$$\theta 2 < ((360°/\text{the number of surfaces of the rotary polyhedron}) \times n) \times 1.17 \quad (2),$$

where n is a natural number less than the number of surfaces of the rotary polyhedron.

7. The optical deflector of claim 6, wherein the angle $\theta 2$ formed by lines connecting each of the circumferential ends of the arcuate wall to the axis of the rotary polyhedron as viewed in an axial direction of the rotary polyhedron satisfies Equation (3) below:

$$\theta 2 \approx (360°/\text{a number of surfaces of the rotary polyhedron}) \times n \quad (3),$$

where n is a natural number less than the number of surfaces of the rotary polyhedron.

8. An optical scanning device comprising:
the optical deflector of claim 6; and
the light source.

9. An image forming apparatus comprising:
the optical scanning device of claim 8; and
the object to be irradiated,
wherein the object to be irradiated is an image carrier having a surface on which an electrostatic latent image is to be formed.

\* \* \* \* \*